Patented Mar. 11, 1947

2,417,180

UNITED STATES PATENT OFFICE 2,417,180

PINE-WOOD RESIN OF INCREASED MELTING POINT AND METHOD OF PRODUCING

Alfred L. Rummelsburg, Wilmington, Del., assignor to Hercules Powder Company, Wilmington, Del., a corporation of Delaware No Drawing. Application March 17, 1945, Serial No. 583,388

14 Claims. (Cl. 260—97)

This invention relates to substantially petroleum hydrocarbon-insoluble pine wood resins of increased melting point and to methods for their production.

Pine wood resins of substantial petroleum hydrocarbon-insoluble content are frequently used in the pulverized state for the stabilization of soil, as addition agents in mortar and Portland cement, in thermoplastic and thermosetting molding compositions, in asphalt emulsions and oil-resistant coatings, etc. There is a pronounced tendency for such pulverized resins, especially those melting below about 120° C., to coalesce and revert during storage to the resinous state. In the past, this tendency to reversion has been overcome by partially neutralizing the resin with lime or other salt-forming agents to raise the melting point. However, the addition of alkali or alkaline earth metals is objectionable in many applications, for example, where both oil and water resistance are desired.

Now, in accordance with this invention, it has been found that by heating pine wood resins containing from about 30% to about 95% petroleum hydrocarbon-insoluble material with a boric acid compound, such as orthoboric acid, boric anhydride, or boric acid esters, at a temperature within the range of about 100° C. to about 250° C., a resinous product of increased melting point and of less tendency toward sintering in the pulverized state and cold flow is produced.

In carrying out this invention, the pine wood resin having a substantial petroleum hydrocarbon-insoluble content is heated at about 100° C. to about 250° C. with an amount of a boric acid compound equivalent to no more than about 15 parts boric acid per 100 parts by weight of the pine wood resin until the boric acid compound has undergone dissolution. The resulting resin may then be poured into suitable containers, or it may be flaked off chilled rolls and stored. The cooled resin may then be pulverized if desired.

Examples to illustrate more fully the particular embodiment of this invention are given below. These, however, are not in any manner to be construed as limitations of the invention but are to serve only as illustrations of the invention as more broadly set forth in this specification and claims. All parts and percentages are by weight unless otherwise indicated.

Example 1

One hundred parts of a pine wood resin having a melting point of 117° C. (Hercules drop method), an acid number of 90, and a gasoline-insoluble content of 85% was melted with 1 part of boric acid and stirred while the temperature was held at 175°–200° C. for 3.5 hours. The resulting resin amounted to 98 parts, the loss in weight being due to moisture and a trace of volatile oils. The melting point of this resin was 149° C.

When pulverized so that 70% would pass through a 200-mesh screen and stored at about 45° C. and about 60% relative humidity for 48 hours, there was no significant change in screen analysis.

Example 2

One hundred parts of a pine wood resin having a melting point of 117° C. (Hercules drop method), an acid number of 90, and a gasoline-insoluble content of 85% was heated at 175°–200° C. with 1 part of powdered boric anhydride for 3.5 hours while stirring to prevent settling of the boric anhydride. There was no loss in weight as a result of this treatment. The treated resin was poured into trays to cool. It was shown to have a drop melting point of 151° C.

Example 3

Four hundred parts of a pine wood resin having a melting point of 86° C. (Hercules drop method), an acid number of 114, and a gasoline-insoluble content of 66% was heated with 5 parts of boric acid at 170° C. for 24 hours. The solution was agitated by bubbling a current of carbon dioxide through the mixture and loss of volatile oils was minimized by passing the effluent carbon dioxide through an air-cooled reflux condenser.

The resulting resin was poured into trays to cool before being pulverized. It had the following analysis: Melting point 131° C., acid number 122, and gasoline-insoluble content 63%.

Example 4

Four hundred parts of a pine wood resin having a melting point of 83° C. (Hercules drop method) and a gasoline-insoluble content of 63% was heated with 18 parts of butyl borate at 130° C. for 1 hour with agitation. The temperature was then increased to 150° C. and a vacuum of 2 to 5 mm. mercury pressure applied to remove the butyl alcohol and any unreacted butyl borate. The resulting resin had a drop melting point of 96° C.

The pine wood resin which is used in carrying out this invention may be any portion or substantially all of that dark-colored fraction of pine wood resin which can be extracted from pine wood with aromatic hydrocarbons and which is characterized by a petroleum hydrocarbon-insolubility of from about 30% to about 95%.

The wood resin extract of pine wood, such as is obtained by extracting pine wood with benzene, consists of pale rosin, gasoline-insoluble resinous material, and color bodies. Frequently, such extract contains 15% or more of gasoline-insoluble resinous material. Upon the treatment of such resinous extract to separate therefrom a fraction of pale rosin, there is formed one or more fractions containing the balance of the resinous material derived from the pine wood. One or more of such remaining fractions may be used as the resin material in this invention. The nonrosin portion of the pine wood extract may be separated by appropriate processes into a fraction of substantially gasoline-insoluble resinous material and a dark-colored intermediate fraction lying between the substantially gasoline-insoluble fraction and rosin. It is difficult to effect an absolutely clean separation between the gasoline-insoluble resinous material and the rosin. By the preparation of a dark-colored intermediate fraction containing some gasoline-insoluble resinous material and color bodies, a very good separation of the pine wood extract into rosin, gasoline-insoluble resinous material, and into this intermediate fraction is effected.

As one of the pine wood resins of this invention, it is preferable to use the dark-colored intermediate fraction largely insoluble in petroleum hydrocarbons and obtained by the refining of impure wood rosin to pale grades by means of a selective solvent for color bodies such as furfural, or a selective adsorbent such as fuller's earth. Such an intermediate fraction contains at least 30% and up to about 80% by weight of a gasoline-insoluble resinous material. Still further, the other pine wood resin which may be utilized in this invention is the substantially completely gasoline-insoluble resinous material derived from pine wood and which contains at least about 80% by weight of gasoline-insoluble resinous material. Mixtures of the foregoing resinous materials may also be employed. As an example of such a mixture, a blend of the dark-colored intermediate fraction and the substantially gasoline-insoluble fraction obtained, for example, from pine wood without separation into the individual fractions either by a process which involves leaving the resins in the wood or by a process which involves separation of the rosin, may be used. The resin material preferably contains at least about 30% of gasoline-insoluble resinous material, varying therefrom up to about 95%.

The dark-colored intermediate fraction referred to above is a product resulting from the process used in decolorizing rosin. For example, so-called FF rosin, which is ruby red in color and is derived from pine wood by extraction with benzene followed by evaporation of the benzene and extraction of the resinous residue with a petroleum hydrocarbon, such as hot petroleum ether or hot gasoline, is decolorized by adding furfural to the hot petroleum hydrocarbon solution of FF rosin, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural, the residue remaining being the dark-colored intermediate fraction referred to. This fraction contains most of the coloring bodies and a larger proportion of the unsaponifiables from the original FF rosin, as well as a good proportion of the rosin acids. It contains a large proportion of oxidized rosin acids and high molecular weight phenolic components and, therefore, is only partially soluble in petroleum hydrocarbon solvents at room temperature. The percentage of gasoline-insolubles varies from about 30% to about 80% by weight. It has a higher flow point, a much higher viscosity, lower acid number, and a higher unsaponifiable content than FF wood rosin. In addition, it is noncrystallizing. Such a fraction is characterized by the following approximate analysis:

Acid number_____ 105–140
Saponification number_____ 150–170
Melting point (Hercules drop method)
°C__ 80–115
Unsaponifiable matter_____per cent__ 10–20
Gasoline—insoluble_____do____ 30–80
Petroleum ether—insoluble_____do____ 30–80

A typical example of such a fraction had the following analysis: Acid number 124; saponification number 150; melting point (drop) 89° C.; gasoline-insoluble 57%; unsaponifiable matter 12%; Lovibond color, dark; and ash content 0.03%.

The substantially gasoline-insoluble fraction referred to above may be prepared from pine wood by the processes set forth in U. S. patents to Hall, Nos. 2,193,026 and 2,221,540. This fraction is characterized by being substantially completely insoluble in petroleum hydrocarbons, such as gasoline. The gasoline-soluble portion of this fraction rarely exceeds 20% by weight. This fraction may be said to comprise most of the gasoline-insoluble resin contained in pine wood. For example, the extraction of pine wood with benzene yields a mixture of this fraction and FF rosin. Upon treatment of the resinous mixture with a mixture of gasoline and a relatively small volume of furfural, the substantially gasoline-insoluble fraction goes into solution in the furfural while the FF rosin goes into solution in the gasoline. The two layers are allowed to separate, and the resinous materials then may be recovered from the separated layers in any suitable manner.

The substantially completely gasoline-insoluble fraction is, in general, defined by the following characteristics: Substantial insolubility in petroleum hydrocarbons, the insolubility being of the order of at least 80%, substantially complete solubility in alcohol, a methoxy content of from about 3% to about 7%, an acid number of from about 80 to about 110, a melting point by the Hercules drop method of from about 95° C. to about 125° C., a saponification number of from about 135 to about 145, and a non-carboxylic hydroxyl content of from about 5% to about 9%. A typical specimen had the following characteristics: Drop melting point 115° C.; acid number 93; gasoline-insoluble matter 88%; toluene-insoluble matter 25%; saponification number 140; and ash content 0.02%.

In general, the pine wood resins employed in carrying out the present invention and which are typified by the dark-colored intermediate fraction of color bodies referred to at length above and the substantially completely gasoline-insoluble fraction and blends thereof may be defined as the resins naturally occurring in pine wood and characterized by a gasoline-insolubility of about 30% to about 95%, an unsaponifiable content of from about 5% to about 20%, a melting point above 85° C. and preferably above 90° C., and an acid number of not over about 140.

The temperature at which the treatment is carried out will depend upon the melting point and reactivity of the particular pine wood resin used. In general, this temperature will be sufficiently high to keep the resin in the liquid state and low enough to prevent decomposition or cracking of the resin. This temperature may thus be within the range of about 100 C. to about 250° C., although the preferred range is about 140° C. to about 200° C.

If desired, solvents may be used to reduce the viscosity so that the temperature can be kept within the preferred range. Usually, solvents such as benzene, toluene, para-cymene, xylene, cumene, carbon tetrachloride, ethylene dichloride, ethyl acetate, etc., will be found most satisfactory, although aliphatic and alicyclic hydrocarbons, such as hexane, octenes, diisobutylene, gasoline, kerosene, octanes, etc., may be used in small amounts. Alcohols, such as methanol, ethanol, propanol, butanol, etc., may also be present, but they must be distilled out of the product in order to attain the desired melting point of the resin. When solvents which boil lower than the reaction temperature are present, the reaction may be carried out under pressure. The amount of solvent used may vary from the small amount needed to effect fluidity up to about 85% of the reaction solution, but not so much as to cause precipitation. The solvents may be removed at atmospheric or lower pressures, and they may be used to aid in the removal of any water present by azeotropic distillation. The treatment may, if desired, also be carried out under reduced pressure to remove water as formed.

The time required for completion of the treatment of the pine wood resin with the boric acid compound will depend upon the amount and kind of boric acid compound used, the temperature and the rate at which the water formed or alcohol liberated in the case of boric esters is removed. This may vary from about 1 hour to about 100 hours. However, a treatment time of 3–24 hours has been found to be satisfactory.

The boric acid compounds which are contemplated for use according to this invention are— boric anhydride and its various hydrates, such as orthoboric acid, mesoboric acid, metaboric acid, dihydrotetraboric acid, and tetraboric acid; esters of orthoboric acid, such as ethyl borate, butyl borate, lauryl borate, cyclohexyl borate, phenyl borate, bornyl borate; and mixed anhydrides of boric acid, such as boric acetic anhydride and boric stearic anhydride, etc.

The amount of boric acid compound which may be used according to this invention will vary according to the degree of increase in melting point desired for the final resin. Usually, about 1–3 parts boric acid or a molecularly equivalent amount of other boric acid compound will be used for each 100 parts of pine wood resin. However, as small an amount as 0.2 part and as large an amount as 15 parts of boric acid or a molecularly equivalent amount of other boric acid compound per 100 parts of pine wood resin are contemplated within the scope of this invention.

In order to facilitate dispersion and dissolution of the boric acid compound in the pine wood resin mixture, any suitable means of agitation may be used, such as mechanical stirring, circulation through a pump, shaking, passing an inert gas through the resinous mixture or air-blowing, etc. Likewise, the product may be sparged, if desired, to remove oils, residual solvents, and other low-boiling material in order to further increase the melting point of the product.

The resinous composition produced by any of the above-described procedures is a hard, friable, high-melting, resin, which is black in color by reflected light but dark red when viewed by transmitted light through a thin film and gives a dark brown powder when crushed. Visually, it differs slightly from the pine wood resin from which it is produced. Analyses show, however, that it is substantially higher melting and more brittle and contains boron. Although its gasoline-insoluble content is usually not materially altered from that of the pine wood resin from which it is produced, its molecular weight is substantially increased. Due, apparently, to its increased melting point, the powdered resin has less tendency to sinter and coalesce, forming agglomerates of powder or compact, resinous masses. Thus, the treated resin may be stored in bags in the pulverized state for long periods of time without reverting to the resinous state and becoming caked or lumpy.

What I claim and desire to protect by Letters Patent is:

1. A method of increasing the melting point of a pine wood resin containing from about 30% to about 95% petroleum hydrocarbon-insoluble material which comprises heating the said pine wood resin for about one hour to about 100 hours at a temperature within the range of about 100° C. to about 250° C. with a boric acid compound selected from the group consisting of boric acids, esters of boric acids, and anhydrides of boric acid, the amount of said boric acid compound being an amount molecularly equivalent to no more than 15% orthoboric acid based on the weight of the pine wood resin.

2. A method of increasing the melting point of a pine wood resin containing from about 30% to about 80% petroleum hydrocarbon-insoluble material which comprises heating the said pine wood resin for about one hour to about 100 hours at a temperature within the range of about 100° C. to about 250° C. with a boric acid compound selected from the group consisting of boric acids, esters of boric acids, and anhydrides of boric acid, the amount of said boric acid compound being an amount molecularly equivalent to no more than 15% orthoboric acid based on the weight of the pine wood resin.

3. A method of increasing the melting point of a pine wood resin containing from about 80% to about 95% petroleum hydrocarbon-insoluble material which comprises heating the said pine wood resin for about one hour to about 100 hours at a temperature within the range of about 100° C. to about 250° C. with a boric acid compound selected from the group consisting of boric acids, esters of boric acids, and anhydrides of boric acid, the amount of said boric acid compound being an amount molecularly equivalent to no more than 15% orthoboric acid based on the weight of the pine wood resin.

4. A method of increasing the melting point of a pine wood resin containing from about 30% to about 95% petroleum hydrocarbon-insoluble material which comprises heating the said pine wood resin for about one hour to about 100 hours at a temperature within the range of about 140° C. to about 200° C. with a boric acid compound selected from the group consisting of boric acids, esters of boric acids, and anhydrides of boric acid, the amount of said boric acid compound being an amount molecularly equivalent to no more than 15% orthoboric acid based on the weight of the pine wood resin.

5. A method of increasing the melting point of a pine wood resin containing from about 30% to about 80% petroleum hydrocarbon-insoluble material which comprises heating the said pine wood resin for about one hour to about 100 hours at a temperature within the range of about 140° C. to about 200° C. with a boric acid compound selected from the group consisting of boric acids, esters of boric acids, and anhydrides of boric acid, the amount of said boric acid compound being an amount molecularly equivalent to no more than 15% orthoboric acid based on the weight of the pine wood resin.

6. A method of increasing the melting point of a pine wood resin containing from about 80% to about 95% petroleum hydrocarbon-insoluble material which comprises heating the said pine wood resin for about one hour to about 100 hours at a temperature within the range of about 140° C. to about 200° C. with a boric acid compound selected from the group consisting of boric acids, the amount of said boric acid compound being an amount molecularly equivalent to no more than 15% orthoboric acid based on the weight of the pine wood resin.

7. A method of increasing the melting point of a pine wood resin containing from about 30% to about 95% petroleum hydrocarbon-insoluble material which comprises heating the said pine wood resin for about one hour to about 100 hours at a temperature within the range of about 140° C. to about 200° C. with up to 15% orthoboric acid based on the weight of the pine wood resin.

8. A method of increasing the melting point of a pine wood resin containing from about 30% to about 95% petroleum hydrocarbon-insoluble material which comprises heating the said pine wood resin for about one hour to about 100 hours at a temperature within the range of about 140° C. to about 250° C. with boric anhydride in an amount molecularly equivalent to no more than about 15% orthoboric acid based on the weight of the pine wood resin.

9. A method of increasing the melting point of a pine wood resin containing from about 30% to about 95% petroleum hydrocarbon-insoluble material which comprises heating the said pine wood resin for about one hour to about 100 hours at a temperature within the range of about 140° C. to about 250° C. with tributyl borate in an amount molecularly equivalent to no more than about 15% orthoboric acid based on the weight of the pine wood resin.

10. A modified pine wood resin produced by heating at a temperature within the range of about 100° C. to about 250° C. for about one hour to about 100 hours a pine wood resin containing from about 30% to about 95% petroleum hydrocarbon-insoluble material with a boric acid compound in an amount molecularly equivalent to no more than 15% orthoboric acid based on the weight of the pine wood resin, said boric acid compound being selected from the group consisting of boric acids, esters of boric acids and anhydrides of boric acid.

11. A modified pine wood resin produced by heating at a temperature within the range of about 100° C. to about 250° C. for about one hour to about 100 hours a pine wood resin containing from about 30% to about 80% petroleum hydrocarbon-insoluble material with a boric acid compound in an amount molecularly equivalent to no more than 15% orthoboric acid based on the weight of the pine wood resin, said boric acid compound being selected from the group consisting of boric acid, esters of boric acids and anhydrides of boric acid.

12. A modified pine wood resin produced by heating at a temperature within the range of about 100° C. to about 250° C. for about one hour to about 100 hours a pine wood resin containing from about 80% to about 95% petroleum hydrocarbon-insoluble material with a boric acid compound in an amount molecularly equivalent to no more than about 15% orthoboric acid based on the weight of the pine wood resin, said boric acid compound being selected from the group consisting of boric acid, esters of boric acids and anhydrides of boric acid.

13. A modified pine wood resin produced by heating at a temperature within the range of about 100° C. to about 250° C. for about one hour to about 100 hours a pine wood resin containing from about 30% to about 80% petroleum hydrocarbon-insoluble material with up to 15% orthoboric acid based on the weight of the pine wood resin.

14. A modified pine wood resin produced by heating at a temperature within the range of about 100° C. to about 250° C. for about one hour to about 100 hours a pine wood resin containing from about 80% to about 95% petroleum hydrocarbon-insoluble material with up to 15% orthoboric acid based on the weight of the pine wood resin.

ALFRED L. RUMMELSBURG.

REFERENCES CITED

The following references are of record in the file of this patent:

UNITED STATES PATENTS

| Number | Name | Date |
|---|---|---|
| 2,120,015 | Borglin | June 7, 1938 |
| 2,221,540 | Hall | Nov. 12, 1940 |
| 2,114,392 | Lane | Apr. 19, 1938 |
| 2,396,575 | Kauth | Mar. 12, 1946 |

Certificate of Correction

Patent No. 2,417,180.   March 11, 1947.

ALFRED L. RUMMELSBURG

It is hereby certified that errors appear in the printed specification of the above numbered patent requiring correction as follows: Column 4, line 64, for "115% C." read *115° C.*; column 5, line 12, for "100 C." read *100° C.*; column 7, line 26, after "acids," insert *esters of boric acids, and anhydrides of boric acid*; and that the said Letters Patent should be read with these corrections therein that the same may conform to the record of the case in the Patent Office.

Signed and sealed this 13th day of May, A. D. 1947.

[SEAL]

LESLIE FRAZER,
*First Assistant Commissioner of Patents.*